(12) United States Patent
Mermoud et al.

(10) Patent No.: US 10,574,512 B1
(45) Date of Patent: Feb. 25, 2020

(54) DEEP LEARNING ARCHITECTURE FOR COLLABORATIVE ANOMALY DETECTION AND EXPLANATION

(71) Applicant: Cisco Technology, Inc., San Jose, CA (US)

(72) Inventors: Grégory Mermoud, Veyras (CH); David Tedaldi, Zurich (CH); Jean-Philippe Vasseur, Saint Martin d'uriage (FR)

(73) Assignee: Cisco Technology, Inc., San Jose, CA (US)

( * ) Notice: Subject to any disclaimer, the term of this patent is extended or adjusted under 35 U.S.C. 154(b) by 0 days.

(21) Appl. No.: 16/120,529

(22) Filed: Sep. 4, 2018

(51) Int. Cl.
*H04L 12/24* (2006.01)
*G06N 3/04* (2006.01)
*G06N 3/08* (2006.01)

(52) U.S. Cl.
CPC ....... *H04L 41/0636* (2013.01); *G06N 3/0454* (2013.01); *G06N 3/08* (2013.01)

(58) Field of Classification Search
CPC ..... H04L 41/0636; G06N 3/0454; G06N 3/08
See application file for complete search history.

(56) References Cited

U.S. PATENT DOCUMENTS

| | | | |
|---|---|---|---|
| 8,086,708 B2 | 12/2011 | Breitgand et al. | |
| 8,140,301 B2 | 3/2012 | Abe et al. | |
| 2015/0193693 A1* | 7/2015 | Vasseur | H04L 43/0876 706/12 |
| 2017/0104657 A1 | 4/2017 | Gopalakrishnan et al. | |
| 2017/0126718 A1* | 5/2017 | Baradaran | H04L 63/1425 |
| 2017/0329660 A1 | 11/2017 | Salunke et al. | |
| 2019/0108439 A1* | 4/2019 | Lu | G06N 3/08 |
| 2019/0260794 A1* | 8/2019 | Woodford | G06K 9/622 |

OTHER PUBLICATIONS

Montavon, et al., "Explaining NonLinear Classification Decisions with Deep Taylor Decomposition", arXiv:1512.02479v1, Dec. 8, 2015, 20 pages, arXiv.org.
Solé, et al., "Survey on Models and Techniques for Root-Cause Analysis", arXiv:1701.08546v2, Jul. 3, 2017, 18 pages, arXiv.org.
Sundararajan, et al., "Axiomatic Attribution for Deep Networks", arXiv:1703.01365v2, Jun. 13, 2017, 11 pages, arXiv.org.

* cited by examiner

*Primary Examiner* — Arvin Eskandarnia
(74) *Attorney, Agent, or Firm* — Behmke Innovation Group LLC; James Behmke; Stephen D. LeBarron

(57) ABSTRACT

In one embodiment, a network assurance service that monitors a network detects a behavioral anomaly in the network using an anomaly detector that compares an anomaly detection threshold to a target value calculated based on a first set of one or more measurements from the network. The service uses an explanation model to predict when the anomaly detector will detect anomalies. The explanation model takes as input a second set of one or more measurements from the network that differs from the first set. The service determines that the detected anomaly is explainable, based on the explanation model correctly predicting the detection of the anomaly by the anomaly detector. The service provides an anomaly detection alert for the detected anomaly to a user interface, based on the detected anomaly being explainable. The anomaly detection alert indicates at least one measurement from the second set as an explanation for the anomaly.

20 Claims, 11 Drawing Sheets

DEEP LEARNING ARCHITECTURE FOR COLLABORATIVE ANOMALY DETECTION AND EXPLANATION

TECHNICAL FIELD

The present disclosure relates generally to computer networks, and, more particularly, to a deep learning architecture for collaborative anomaly detection and explanation.

BACKGROUND

Networks are large-scale distributed systems governed by complex dynamics and very large number of parameters. In general, network assurance involves applying analytics to captured network information, to assess the health of the network. For example, a network assurance system may track and assess metrics such as available bandwidth, packet loss, jitter, and the like, to ensure that the experiences of users of the network are not impinged. However, as networks continue to evolve, so too will the number of applications present in a given network, as well as the number of metrics available from the network.

BRIEF DESCRIPTION OF THE DRAWINGS

The embodiments herein may be better understood by referring to the following description in conjunction with the accompanying drawings in which like reference numerals indicate identically or functionally similar elements, of which:

FIG. 6 illustrates an example display of suggested actions for a detected anomaly;

DESCRIPTION OF EXAMPLE EMBODIMENTS

Overview

Figure 1A:
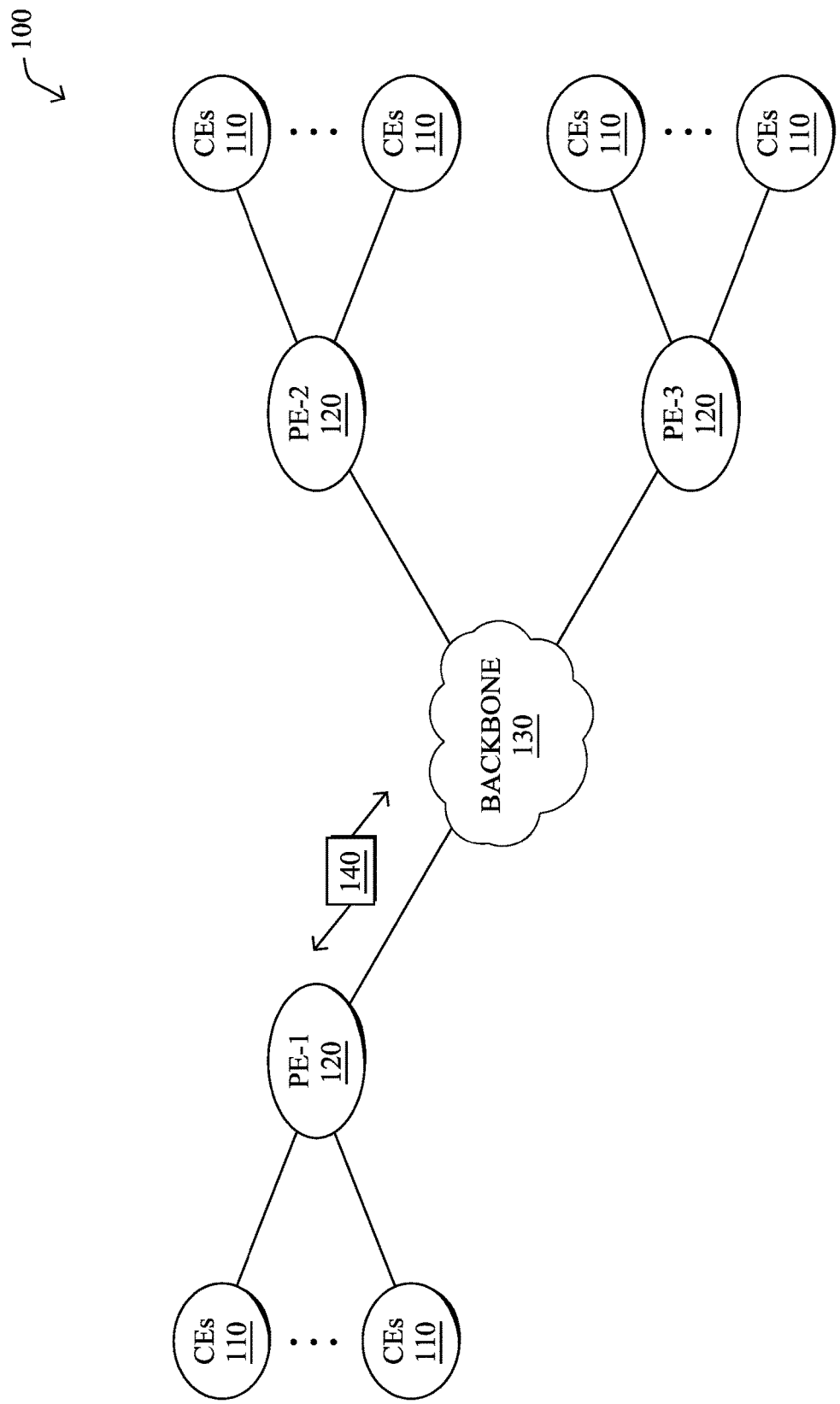
FIGS. 1A-1B illustrate an example communication network.

According to one or more embodiments of the disclosure, a network assurance service that monitors a network detects a behavioral anomaly in the monitored network using a machine learning-based anomaly detector and by comparing an anomaly detection threshold to a target value calculated based on a first set of one or more measurements from the network. The service uses a machine learning-based explanation model to predict when the anomaly detector will detect anomalies. The explanation model takes as input a second set of one or more measurements from the network that differ from the first set of one or more measurements. The service determines that the behavioral anomaly detected by the anomaly detector is explainable, based on the explanation model correctly predicting the detection of the anomaly by the anomaly detector. The service provides an anomaly detection alert for the detected anomaly to a user interface, based on the detected anomaly being explainable. The anomaly detection alert indicates at least one measurement from the second set as an explanation for the detected anomaly.

DESCRIPTION

A computer network is a geographically distributed collection of nodes interconnected by communication links and segments for transporting data between end nodes, such as personal computers and workstations, or other devices, such as sensors, etc. Many types of networks are available, with the types ranging from local area networks (LANs) to wide area networks (WANs). LANs typically connect the nodes over dedicated private communications links located in the same general physical location, such as a building or campus. WANs, on the other hand, typically connect geographically dispersed nodes over long-distance communications links, such as common carrier telephone lines, optical lightpaths, synchronous optical networks (SONET), or synchronous digital hierarchy (SDH) links, or Powerline Communications (PLC) such as IEEE 61334, IEEE P1901.2, and others. The Internet is an example of a WAN that connects disparate networks throughout the world, providing global communication between nodes on various networks. The nodes typically communicate over the network by exchanging discrete frames or packets of data according to predefined protocols, such as the Transmission Control Protocol/Internet Protocol (TCP/IP). In this context, a protocol consists of a set of rules defining how the nodes interact with each other. Computer networks may be further interconnected by an intermediate network node, such as a router, to extend the effective "size" of each network.

Smart object networks, such as sensor networks, in particular, are a specific type of network having spatially distributed autonomous devices such as sensors, actuators, etc., that cooperatively monitor physical or environmental conditions at different locations, such as, e.g., energy/power consumption, resource consumption (e.g., water/gas/etc. for advanced metering infrastructure or "AMI" applications) temperature, pressure, vibration, sound, radiation, motion, pollutants, etc. Other types of smart objects include actuators, e.g., responsible for turning on/off an engine or perform any other actions. Sensor networks, a type of smart object network, are typically shared-media networks, such as wireless or PLC networks. That is, in addition to one or more sensors, each sensor device (node) in a sensor network may generally be equipped with a radio transceiver or other communication port such as PLC, a microcontroller, and an energy source, such as a battery. Often, smart object networks are considered field area networks (FANs), neighborhood area networks (NANs), personal area networks (PANs), etc. Generally, size and cost constraints on smart object nodes (e.g., sensors) result in corresponding constraints on resources such as energy, memory, computational speed and bandwidth.

FIG. 1A is a schematic block diagram of an example computer network 100 illustratively comprising nodes/devices, such as a plurality of routers/devices interconnected by links or networks, as shown. For example, customer edge (CE) routers 110 may be interconnected with provider edge (PE) routers 120 (e.g., PE-1, PE-2, and PE-3) in order to communicate across a core network, such as an illustrative network backbone 130. For example, routers 110, 120 may be interconnected by the public Internet, a multiprotocol label switching (MPLS) virtual private network (VPN), or the like. Data packets 140 (e.g., traffic/messages) may be exchanged among the nodes/devices of the computer network 100 over links using predefined network communication protocols such as the Transmission Control Protocol/Internet Protocol (TCP/IP), User Datagram Protocol (UDP), Asynchronous Transfer Mode (ATM) protocol, Frame Relay protocol, or any other suitable protocol. Those skilled in the art will understand that any number of nodes, devices, links, etc. may be used in the computer network, and that the view shown herein is for simplicity.

In some implementations, a router or a set of routers may be connected to a private network (e.g., dedicated leased lines, an optical network, etc.) or a virtual private network (VPN), such as an MPLS VPN thanks to a carrier network, via one or more links exhibiting very different network and service level agreement characteristics. For the sake of illustration, a given customer site may fall under any of the following categories:

1.) Site Type A: a site connected to the network (e.g., via a private or VPN link) using a single CE router and a single link, with potentially a backup link (e.g., a 3G/4G/LTE backup connection). For example, a particular CE router 110 shown in network 100 may support a given customer site, potentially also with a backup link, such as a wireless connection.

2.) Site Type B: a site connected to the network using two MPLS VPN links (e.g., from different Service Providers), with potentially a backup link (e.g., a 3G/4G/LTE connection). A site of type B may itself be of different types:

2a.) Site Type B1: a site connected to the network using two MPLS VPN links (e.g., from different Service Providers), with potentially a backup link (e.g., a 3G/4G/LTE connection).

2b.) Site Type B2: a site connected to the network using one MPLS VPN link and one link connected to the public Internet, with potentially a backup link (e.g., a 3G/4G/LTE connection). For example, a particular customer site may be connected to network 100 via PE-3 and via a separate Internet connection, potentially also with a wireless backup link.

2c.) Site Type B3: a site connected to the network using two links connected to the public Internet, with potentially a backup link (e.g., a 3G/4G/LTE connection).

Notably, MPLS VPN links are usually tied to a committed service level agreement, whereas Internet links may either have no service level agreement at all or a loose service level agreement (e.g., a "Gold Package" Internet service connection that guarantees a certain level of performance to a customer site).

3.) Site Type C: a site of type B (e.g., types B1, B2 or B3) but with more than one CE router (e.g., a first CE router connected to one link while a second CE router is connected to the other link), and potentially a backup link (e.g., a wireless 3G/4G/LTE backup link). For example, a particular customer site may include a first CE router 110 connected to PE-2 and a second CE router 110 connected to PE-3.

Figure 1B:
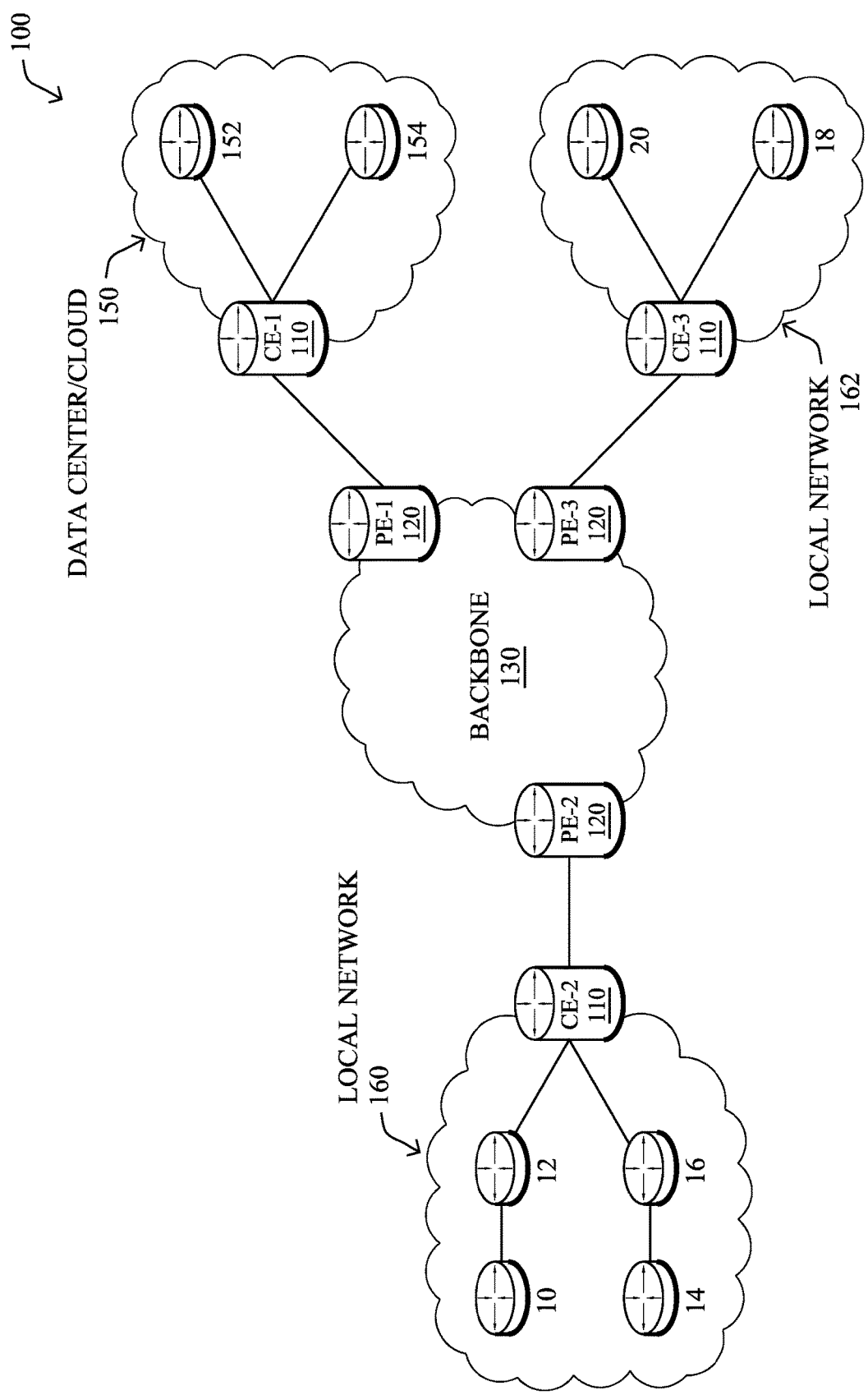

FIG. 1B illustrates an example of network 100 in greater detail, according to various embodiments. As shown, network backbone 130 may provide connectivity between devices located in different geographical areas and/or different types of local networks. For example, network 100 may comprise local/branch networks 160, 162 that include devices/nodes 10-16 and devices/nodes 18-20, respectively, as well as a data center/cloud environment 150 that includes servers 152-154. Notably, local networks 160-162 and data center/cloud environment 150 may be located in different geographic locations.

Servers 152-154 may include, in various embodiments, a network management server (NMS), a dynamic host configuration protocol (DHCP) server, a constrained application protocol (CoAP) server, an outage management system (OMS), an application policy infrastructure controller (APIC), an application server, etc. As would be appreciated, network 100 may include any number of local networks, data centers, cloud environments, devices/nodes, servers, etc.

In some embodiments, the techniques herein may be applied to other network topologies and configurations. For example, the techniques herein may be applied to peering points with high-speed links, data centers, etc.

In various embodiments, network 100 may include one or more mesh networks, such as an Internet of Things network. Loosely, the term "Internet of Things" or "IoT" refers to uniquely identifiable objects (things) and their virtual representations in a network-based architecture. In particular, the next frontier in the evolution of the Internet is the ability to connect more than just computers and communications devices, but rather the ability to connect "objects" in general, such as lights, appliances, vehicles, heating, ventilating, and air-conditioning (HVAC), windows and window shades and blinds, doors, locks, etc. The "Internet of Things" thus generally refers to the interconnection of objects (e.g., smart objects), such as sensors and actuators, over a computer network (e.g., via IP), which may be the public Internet or a private network.

Notably, shared-media mesh networks, such as wireless or PLC networks, etc., are often on what is referred to as Low-Power and Lossy Networks (LLNs), which are a class of network in which both the routers and their interconnect are constrained: LLN routers typically operate with constraints, e.g., processing power, memory, and/or energy (battery), and their interconnects are characterized by, illustratively, high loss rates, low data rates, and/or instability. LLNs are comprised of anything from a few dozen to thousands or even millions of LLN routers, and support point-to-point traffic (between devices inside the LLN), point-to-multipoint traffic (from a central control point such at the root node to a subset of devices inside the LLN), and multipoint-to-point traffic (from devices inside the LLN towards a central control point). Often, an IoT network is implemented with an LLN-like architecture. For example, as shown, local network 160 may be an LLN in which CE-2 operates as a root node for nodes/devices 10-16 in the local mesh, in some embodiments.

In contrast to traditional networks, LLNs face a number of communication challenges. First, LLNs communicate over a physical medium that is strongly affected by environmental conditions that change over time. Some examples include temporal changes in interference (e.g., other wireless networks or electrical appliances), physical obstructions (e.g., doors opening/closing, seasonal changes such as the foliage density of trees, etc.), and propagation characteristics of the physical media (e.g., temperature or humidity changes, etc.). The time scales of such temporal changes can range between milliseconds (e.g., transmissions from other transceivers) to months (e.g., seasonal changes of an outdoor environment). In addition, LLN devices typically use low-cost and low-power designs that limit the capabilities of their transceivers. In particular, LLN transceivers typically provide low throughput. Furthermore, LLN transceivers typically support limited link margin, making the effects of interference and environmental changes visible to link and network protocols. The high number of nodes in LLNs in comparison to traditional networks also makes routing, quality of service (QoS), security, network management, and traffic engineering extremely challenging, to mention a few.

Figure 2:
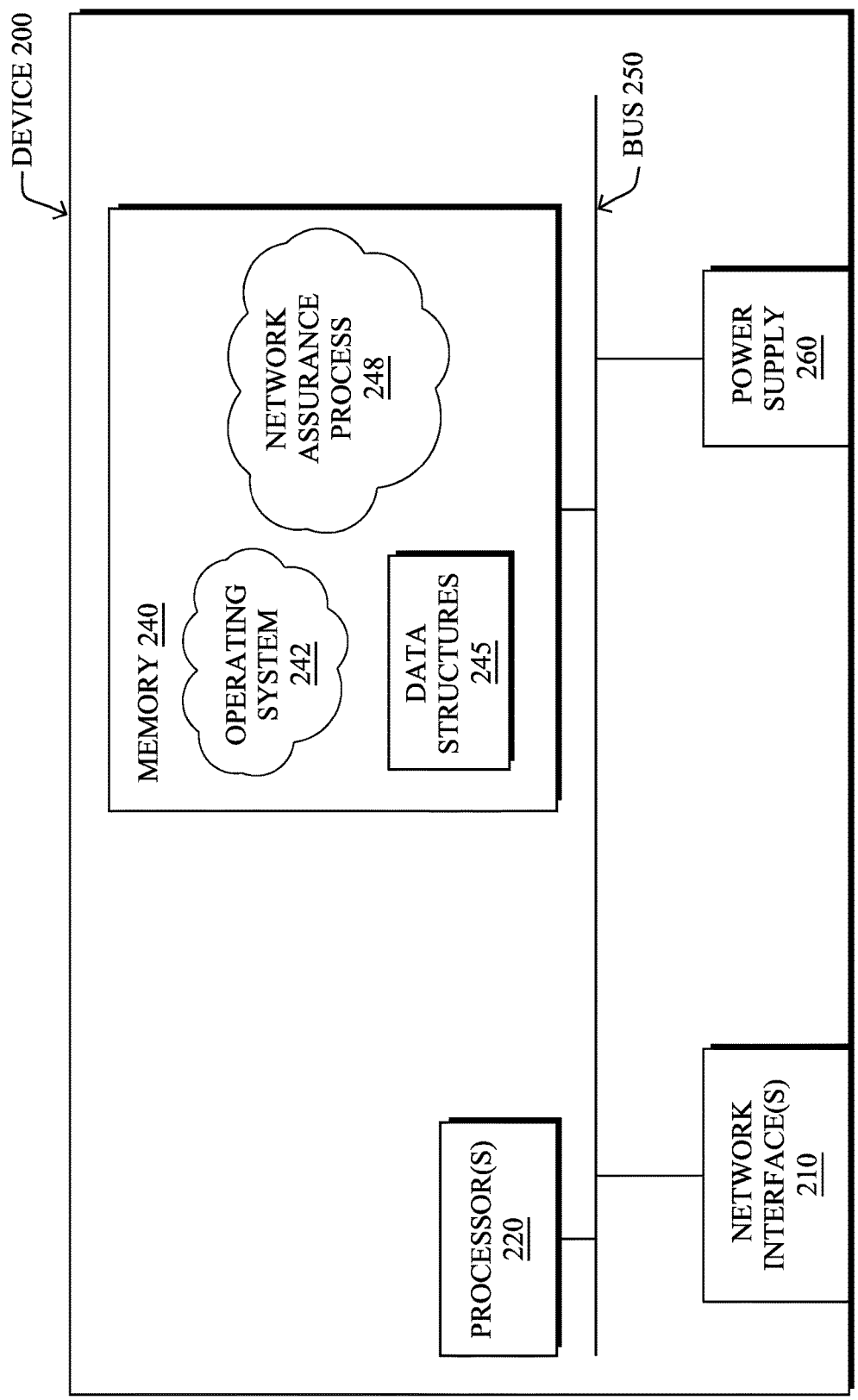
FIG. 2 illustrates an example network device/node.

FIG. 2 is a schematic block diagram of an example node/device 200 that may be used with one or more embodiments described herein, e.g., as any of the computing devices shown in FIGS. 1A-1B, particularly the PE routers 120, CE routers 110, nodes/device 10-20, servers 152-154 (e.g., a network controller located in a data center, etc.), any other computing device that supports the operations of network 100 (e.g., switches, etc.), or any of the other devices referenced below. The device 200 may also be any other suitable type of device depending upon the type of network architecture in place, such as IoT nodes, etc. Device 200 comprises one or more network interfaces 210, one or more processors 220, and a memory 240 interconnected by a system bus 250, and is powered by a power supply 260.

The network interfaces 210 include the mechanical, electrical, and signaling circuitry for communicating data over physical links coupled to the network 100. The network interfaces may be configured to transmit and/or receive data using a variety of different communication protocols. Notably, a physical network interface 210 may also be used to implement one or more virtual network interfaces, such as for virtual private network (VPN) access, known to those skilled in the art.

The memory 240 comprises a plurality of storage locations that are addressable by the processor(s) 220 and the network interfaces 210 for storing software programs and data structures associated with the embodiments described herein. The processor 220 may comprise necessary elements or logic adapted to execute the software programs and manipulate the data structures 245. An operating system 242 (e.g., the Internetworking Operating System, or IOS®, of Cisco Systems, Inc., another operating system, etc.), portions of which are typically resident in memory 240 and executed by the processor(s), functionally organizes the node by, inter alia, invoking network operations in support of software processors and/or services executing on the device. These software processors and/or services may comprise a network assurance process 248, as described herein, any of which may alternatively be located within individual network interfaces.

It will be apparent to those skilled in the art that other processor and memory types, including various computer-readable media, may be used to store and execute program instructions pertaining to the techniques described herein. Also, while the description illustrates various processes, it is expressly contemplated that various processes may be embodied as modules configured to operate in accordance with the techniques herein (e.g., according to the functionality of a similar process). Further, while processes may be shown and/or described separately, those skilled in the art will appreciate that processes may be routines or modules within other processes.

Network assurance process 248 includes computer executable instructions that, when executed by processor(s) 220, cause device 200 to perform network assurance functions as part of a network assurance infrastructure within the network. In general, network assurance refers to the branch of networking concerned with ensuring that the network provides an acceptable level of quality in terms of the user experience. For example, in the case of a user participating in a videoconference, the infrastructure may enforce one or more network policies regarding the videoconference traffic, as well as monitor the state of the network, to ensure that the user does not perceive potential issues in the network (e.g., the video seen by the user freezes, the audio output drops, etc.).

In some embodiments, network assurance process 248 may use any number of predefined health status rules, to enforce policies and to monitor the health of the network, in view of the observed conditions of the network. For example, one rule may be related to maintaining the service usage peak on a weekly and/or daily basis and specify that if the monitored usage variable exceeds more than 10% of the per day peak from the current week AND more than 10% of the last four weekly peaks, an insight alert should be triggered and sent to a user interface.

Another example of a health status rule may involve client transition events in a wireless network. In such cases, whenever there is a failure in any of the transition events, the wireless controller may send a reason_code to the assurance system. To evaluate a rule regarding these conditions, the network assurance system may then group 150 failures into different "buckets" (e.g., Association, Authentication, Mobility, DHCP, WebAuth, Configuration, Infra, Delete, De-Authorization) and continue to increment these counters per service set identifier (SSID), while performing averaging every five minutes and hourly. The system may also maintain a client association request count per SSID every five minutes and hourly, as well. To trigger the rule, the system may evaluate whether the error count in any bucket has exceeded 20% of the total client association request count for one hour.

In various embodiments, network assurance process 248 may also utilize machine learning techniques, to enforce policies and to monitor the health of the network. In general, machine learning is concerned with the design and the development of techniques that take as input empirical data (such as network statistics and performance indicators), and recognize complex patterns in these data. One very common pattern among machine learning techniques is the use of an underlying model M, whose parameters are optimized for minimizing the cost function associated to M, given the input data. For instance, in the context of classification, the model M may be a straight line that separates the data into two classes (e.g., labels) such that $M=a*x+b*y+c$ and the cost function would be the number of misclassified points. The learning process then operates by adjusting the parameters a,b,c such that the number of misclassified points is minimal. After this optimization phase (or learning phase), the model M can be used very easily to classify new data points. Often, M is a statistical model, and the cost function is inversely proportional to the likelihood of M, given the input data.

In various embodiments, network assurance process 248 may employ one or more supervised, unsupervised, or semi-supervised machine learning models. Generally, supervised learning entails the use of a training set of data, as noted above, that is used to train the model to apply labels to the input data. For example, the training data may include sample network observations that do, or do not, violate a given network health status rule and are labeled as such. On the other end of the spectrum are unsupervised techniques that do not require a training set of labels. Notably, while a supervised learning model may look for previously seen patterns that have been labeled as such, an unsupervised model may instead look to whether there are sudden changes in the behavior. Semi-supervised learning models take a middle ground approach that uses a greatly reduced set of labeled training data.

Example machine learning techniques that network assurance process 248 can employ may include, but are not limited to, nearest neighbor (NN) techniques (e.g., k-NN models, replicator NN models, etc.), statistical techniques (e.g., Bayesian networks, etc.), clustering techniques (e.g., k-means, mean-shift, etc.), neural networks (e.g., reservoir networks, artificial neural networks, etc.), support vector machines (SVMs), logistic or other regression, Markov models or chains, principal component analysis (PCA) (e.g., for linear models), multi-layer perceptron (MLP) ANNs (e.g., for non-linear models), replicating reservoir networks (e.g., for non-linear models, typically for time series), random forest classification, or the like.

The performance of a machine learning model can be evaluated in a number of ways based on the number of true positives, false positives, true negatives, and/or false negatives of the model. For example, the false positives of the model may refer to the number of times the model incorrectly predicted whether a network health status rule was violated. Conversely, the false negatives of the model may refer to the number of times the model predicted that a health status rule was not violated when, in fact, the rule was violated. True negatives and positives may refer to the number of times the model correctly predicted whether a rule was violated or not violated, respectively. Related to these measurements are the concepts of recall and precision. Generally, recall refers to the ratio of true positives to the sum of true positives and false negatives, which quantifies the sensitivity of the model. Similarly, precision refers to the ratio of true positives the sum of true and false positives.

Figure 3:
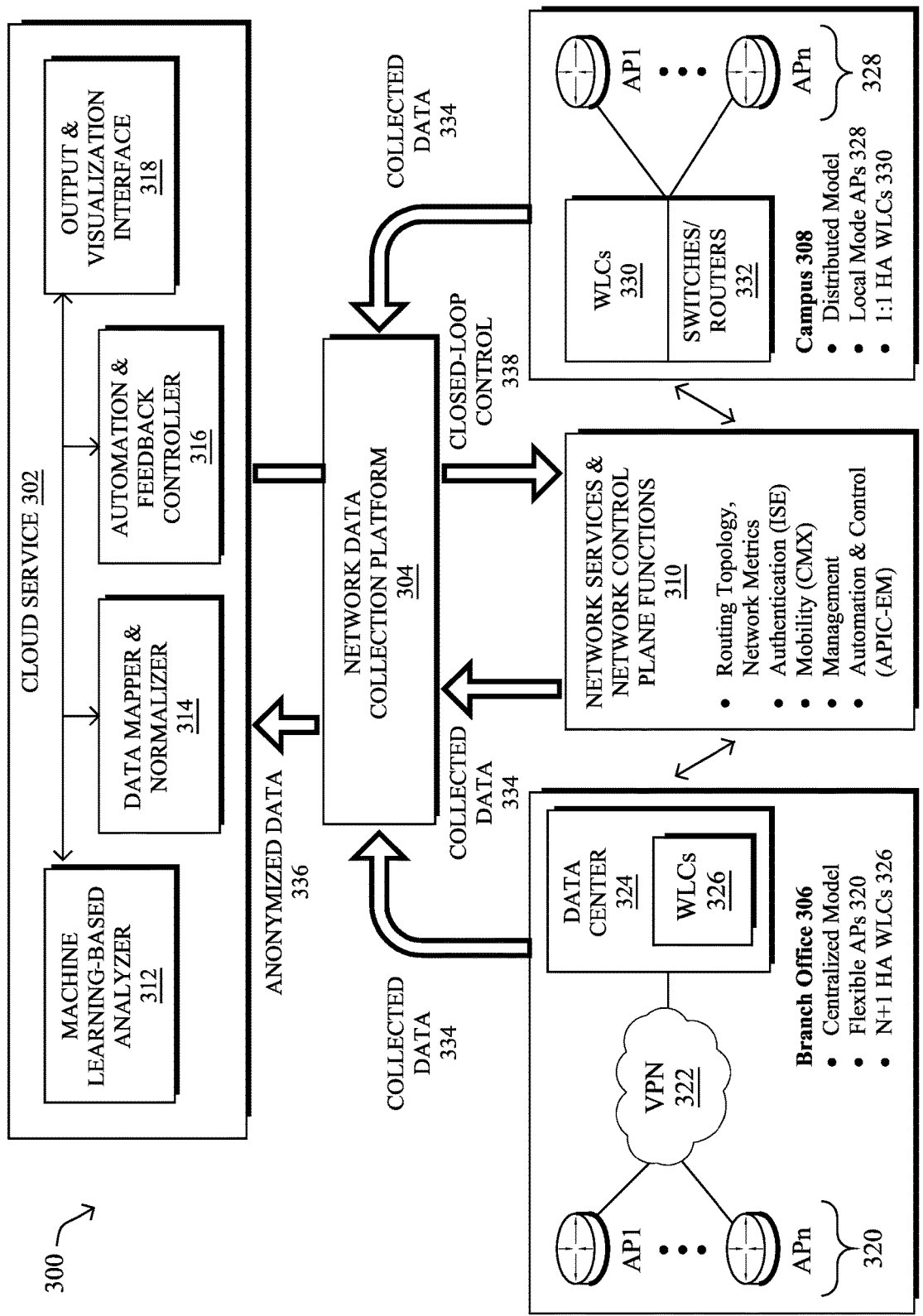
FIG. 3 illustrates an example network assurance system.

FIG. 3 illustrates an example network assurance system 300, according to various embodiments. As shown, at the core of network assurance system 300 may be a cloud service 302 that leverages machine learning in support of cognitive analytics for the network, predictive analytics (e.g., models used to predict user experience, etc.), troubleshooting with root cause analysis, and/or trending analysis for capacity planning. Generally, architecture 300 may support both wireless and wired network, as well as LLNs/IoT networks.

In various embodiments, cloud service 302 may oversee the operations of the network of an entity (e.g., a company, school, etc.) that includes any number of local networks. For example, cloud service 302 may oversee the operations of the local networks of any number of branch offices (e.g., branch office 306) and/or campuses (e.g., campus 308) that may be associated with the entity. Data collection from the various local networks/locations may be performed by a network data collection platform 304 that communicates with both cloud service 302 and the monitored network of the entity.

The network of branch office 306 may include any number of wireless access points 320 (e.g., a first access point AP1 through nth access point, APn) through which endpoint nodes may connect. Access points 320 may, in turn, be in communication with any number of wireless LAN controllers (WLCs) 326 (e.g., supervisory devices that provide control over APs) located in a centralized datacenter 324. For example, access points 320 may communicate with WLCs 326 via a VPN 322 and network data collection platform 304 may, in turn, communicate with the devices in datacenter 324 to retrieve the corresponding network feature data from access points 320, WLCs 326, etc. In such a centralized model, access points 320 may be flexible access points and WLCs 326 may be N+1 high availability (HA) WLCs, by way of example.

Conversely, the local network of campus 308 may instead use any number of access points 328 (e.g., a first access point AP1 through nth access point APm) that provide connectivity to endpoint nodes, in a decentralized manner. Notably, instead of maintaining a centralized datacenter, access points 328 may instead be connected to distributed WLCs 330 and switches/routers 332. For example, WLCs 330 may be 1:1 HA WLCs and access points 328 may be local mode access points, in some implementations.

To support the operations of the network, there may be any number of network services and control plane functions 310. For example, functions 310 may include routing topology and network metric collection functions such as, but not limited to, routing protocol exchanges, path computations, monitoring services (e.g., NetFlow or IPFIX exporters), etc. Further examples of functions 310 may include authentication functions, such as by an Identity Services Engine (ISE) or the like, mobility functions such as by a Connected Mobile Experiences (CMX) function or the like, management functions, and/or automation and control functions such as by an APIC-Enterprise Manager (APIC-EM).

During operation, network data collection platform 304 may receive a variety of data feeds that convey collected data 334 from the devices of branch office 306 and campus 308, as well as from network services and network control plane functions 310. Example data feeds may comprise, but are not limited to, management information bases (MIBS) with Simple Network Management Protocol (SNMP)v2, JavaScript Object Notation (JSON) Files (e.g., WSA wireless, etc.), NetFlow/IPFIX records, logs reporting in order to collect rich datasets related to network control planes (e.g., Wi-Fi roaming, join and authentication, routing, QoS, PHY/MAC counters, links/node failures), traffic characteristics, and other such telemetry data regarding the monitored network. As would be appreciated, network data collection platform 304 may receive collected data 334 on a push and/or pull basis, as desired. Network data collection platform 304 may prepare and store the collected data 334 for processing by cloud service 302. In some cases, network data collection platform may also anonymize collected data 334 before providing the anonymized data 336 to cloud service 302.

In some cases, cloud service 302 may include a data mapper and normalizer 314 that receives the collected and/or anonymized data 336 from network data collection platform 304. In turn, data mapper and normalizer 314 may map and normalize the received data into a unified data model for further processing by cloud service 302. For example, data mapper and normalizer 314 may extract certain data features from data 336 for input and analysis by cloud service 302.

In various embodiments, cloud service 302 may include a machine learning (ML)-based analyzer 312 configured to analyze the mapped and normalized data from data mapper and normalizer 314. Generally, analyzer 312 may comprise a power machine learning-based engine that is able to understand the dynamics of the monitored network, as well as to predict behaviors and user experiences, thereby allowing cloud service 302 to identify and remediate potential network issues before they happen.

Machine learning-based analyzer 312 may include any number of machine learning models to perform the techniques herein, such as for cognitive analytics, predictive analysis, and/or trending analytics as follows:

Cognitive Analytics Model(s): The aim of cognitive analytics is to find behavioral patterns in complex and unstructured datasets. For the sake of illustration, analyzer 312 may be able to extract patterns of Wi-Fi roaming in the network and roaming behaviors (e.g., the "stickiness" of clients to APs 320, 328, "ping-pong" clients, the number of visited APs 320, 328, roaming triggers, etc). Analyzer 312 may characterize such patterns by the nature of the device (e.g., device type, OS) according to the place in the network, time of day, routing topology, type of AP/WLC, etc., and potentially correlated with other network metrics (e.g., application, QoS, etc.). In another example, the cognitive analytics model(s) may be configured to extract AP/WLC related patterns such as the number of clients, traffic throughput as a function of time, number of roaming processed, or the like, or even end-device related patterns (e.g., roaming patterns of iPhones, IoT Healthcare devices, etc.).

Predictive Analytics Model(s): These model(s) may be configured to predict user experiences, which is a significant paradigm shift from reactive approaches to network health. For example, in a Wi-Fi network, analyzer 312 may be configured to build predictive models for the joining/roaming time by taking into account a large plurality of parameters/observations (e.g., RF variables, time of day, number of clients, traffic load, DHCP/DNS/Radius time, AP/WLC loads, etc.). From this, analyzer 312 can detect potential network issues before they happen. Furthermore, should abnormal joining time be predicted by analyzer 312, cloud service 312 will be able to identify the major root cause of this predicted condition, thus allowing cloud service 302 to remedy the situation before it occurs. The predictive analytics model(s) of analyzer 312 may also be able to predict other metrics such as the expected throughput for a client using a specific application. In yet another example, the predictive analytics model(s) may predict the user experience for voice/video quality using network variables (e.g., a predicted user rating of 1-5 stars for a given session, etc.), as function of the network state. As would be appreciated, this approach may be far superior to traditional approaches that rely on a mean opinion score (MOS). In contrast, cloud service 302 may use the predicted user experiences from analyzer 312 to provide information to a network administrator or architect in real-time and enable closed loop control over the network by cloud service 302, accordingly. For example, cloud service 302 may signal to a particular type of endpoint node in branch office 306 or campus 308 (e.g., an iPhone, an IoT healthcare device, etc.) that better QoS will be achieved if the device switches to a different AP 320 or 328.

Trending Analytics Model(s): The trending analytics model(s) may include multivariate models that can predict future states of the network, thus separating noise from actual network trends. Such predictions can be used, for example, for purposes of capacity planning and other "what-if" scenarios.

Machine learning-based analyzer 312 may be specifically tailored for use cases in which machine learning is the only viable approach due to the high dimensionality of the dataset and patterns cannot otherwise be understood and learned. For example, finding a pattern so as to predict the actual user experience of a video call, while taking into account the nature of the application, video CODEC parameters, the states of the network (e.g., data rate, RF, etc.), the current observed load on the network, destination being reached, etc., is simply impossible using predefined rules in a rule-based system.

Unfortunately, there is no one-size-fits-all machine learning methodology that is capable of solving all, or even most, use cases. In the field of machine learning, this is referred to as the "No Free Lunch" theorem. Accordingly, analyzer 312 may rely on a set of machine learning processes that work in conjunction with one another and, when assembled, operate as a multi-layered kernel. This allows network assurance system 300 to operate in real-time and constantly learn and adapt to new network conditions and traffic characteristics. In other words, not only can system 300 compute complex patterns in highly dimensional spaces for prediction or behavioral analysis, but system 300 may constantly evolve according to the captured data/observations from the network.

Cloud service 302 may also include output and visualization interface 318 configured to provide sensory data to a network administrator or other user via one or more user interface devices (e.g., an electronic display, a keypad, a speaker, etc.). For example, interface 318 may present data indicative of the state of the monitored network, current or predicted issues in the network (e.g., the violation of a defined rule, etc.), insights or suggestions regarding a given condition or issue in the network, etc. Cloud service 302 may also receive input parameters from the user via interface 318 that control the operation of system 300 and/or the monitored network itself. For example, interface 318 may receive an instruction or other indication to adjust/retrain one of the models of analyzer 312 from interface 318 (e.g., the user deems an alert/rule violation as a false positive).

In various embodiments, cloud service 302 may further include an automation and feedback controller 316 that provides closed-loop control instructions 338 back to the various devices in the monitored network. For example, based on the predictions by analyzer 312, the evaluation of any predefined health status rules by cloud service 302, and/or input from an administrator or other user via input 318, controller 316 may instruct an endpoint client device, networking device in branch office 306 or campus 308, or a network service or control plane function 310, to adjust its operations (e.g., by signaling an endpoint to use a particular AP 320 or 328, etc.).

As noted above, anomaly detection is a particular type of unsupervised learning targeted to the detection of rare events in a dataset. More specifically, given an observation represented as a N-dimensional feature vector x in $R^N$, an anomaly detector A provides a score s that measures how unlikely x is, such that $A(x)=s$. The network assurance system can then use this score to detect so-called anomalies in the monitored network, that is, observations that are sufficiently unlikely to be considered relevant for a given problem.

A fundamental issue with anomaly detection methods is the assumption that the most unlikely observations are relevant. Indeed, there are many situations in which anomalies are actually not among the rarest conditions in the dataset and, conversely, when rare events are not relevant. For instance, when dealing with performance or reliability issues in enterprise networks, the patterns of interest may not be among the rarest or most extreme conditions. Notably, while these issues are probably only occasional, legitimate and healthy conditions come in many forms, some of which may be scarcer than problematic ones.

Typically, the lack of relevancy of detected anomalies is addressed by tuning how an observation, such as a network metric, is represented as a feature vector x. In particular, the input features for the anomaly detector should be designed in such a way that the normal observations are in dense regions of the feature space whereas anomalous observations are outliers, that is, they appear far from the dense regions of the space. To achieve this, features that account for the context of the observation are also used as input to the anomaly detector.

By way of example, consider the onboarding times of clients in the network with a particular SSID. On its face, this measurement alone is not enough to determine whether there is a problem in the network. Indeed, one would need to understand the types of devices trying to onboard to the network, the types of authentication mechanisms in place, as well as the hardware model of the networking devices involved (e.g., APs, WLCs, etc.), to determine whether a given value is truly anomalous and of relevance. For instance, some types of clients are notoriously slow to onboard to wireless networks and, therefore, an increase in the measured onboarding time in the presence of such devices is normal and would be expected. By providing such contextual features, the anomaly detector can distinguish between different normal and abnormal situations more reliably.

While contextual features should be provided to the anomaly detector to avoid irrelevant alerts, a feature that is a strong indicator of a problem should also be excluded. For instance, a very poor received signal strength indicator (RSSI) will probably lead to a higher onboarding time, especially if a large proportion of the clients are impacted. As a result, this feature should not be fed to the anomaly detector, as it will start to "explain away" such situations. These types of features/measurements are referred to herein as explanatory features, since they can effectively be used to "explain" or even, in some case, represent the underlying root cause of the issue.

Deep Learning Architecture for Collaborative Anomaly Detection and Explanation

The techniques herein introduce a deep learning architecture for network assurance that relies on collaborative training to build models that achieve anomaly detection and root cause analysis in a single, consistent manner. In particular, the techniques herein propose leveraging both contextual and explanatory features, in order to perform both anomaly detection and root cause analysis in a single model trained end-to-end. Preliminary testing of the techniques herein has shown that the techniques result in models that exhibit better performance in terms of both precision and recall over that of standard anomaly detection models. Furthermore, the techniques herein offer principled mechanisms to determine the root cause/explanation of a detected anomaly in the monitored network.

Specifically, according to one or more embodiments of the disclosure as described in detail below, a network assurance service that monitors a network detects a behavioral anomaly in the monitored network using a machine learning-based anomaly detector and by comparing an anomaly detection threshold to a target value calculated based on a first set of one or more measurements from the network. The service uses a machine learning-based explanation model to predict when the anomaly detector will detect anomalies. The explanation model takes as input a second set of one or more measurements from the network that differ from the first set of one or more measurements. The service determines that the behavioral anomaly detected by the anomaly detector is explainable, based on the explanation model correctly predicting the detection of the anomaly by the anomaly detector. The service provides an anomaly detection alert for the detected anomaly to a user interface, based on the detected anomaly being explainable. The anomaly detection alert indicates at least one measurement from the second set as an explanation for the detected anomaly.

Illustratively, the techniques described herein may be performed by hardware, software, and/or firmware, such as in accordance with the network assurance process 248, which may include computer executable instructions executed by the processor 220 (or independent processor of interfaces 210) to perform functions relating to the techniques described herein.

Figure 4:
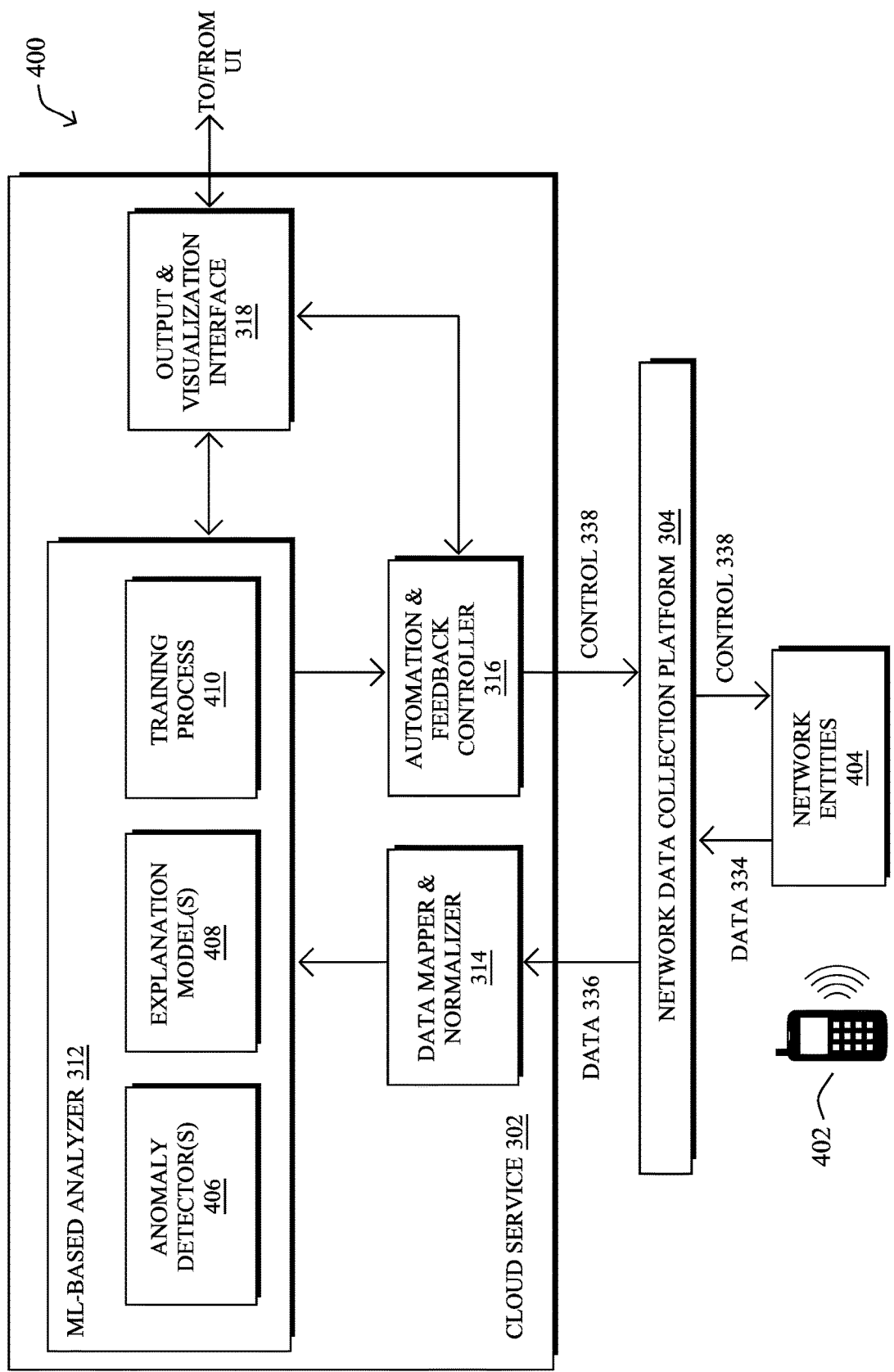
FIG. 4 illustrates an example architecture for collaborative anomaly detection and explanation.

Operationally, FIG. 4 illustrates an example architecture 400 for collaborative anomaly detection and explanation in a network assurance system, according to various embodiments. At the core of architecture 400 may be the following components: one or more anomaly detectors 406, one or more explanation models 408, and/or a training process 410. In some implementations, the components 406-410 of architecture 400 may be implemented within a network assurance system, such as system 300 shown in FIG. 3. Accordingly, the components 406-410 of architecture 400 shown may be implemented as part of cloud service 302 (e.g., as part of machine learning-based analyzer 312 and/or output and visualization interface 318), as part of network data collection platform 304, and/or on one or more network elements/entities 404 that communicate with one or more client devices 402 within the monitored network itself. Further, these components 406-410 may be implemented in a distributed manner or implemented as its own stand-alone service, either as part of the local network under observation or as a remote service. In addition, the functionalities of the components of architecture 400 may be combined, omitted, or implemented as part of other processes, as desired.

During operation, service 302 may receive telemetry/monitored data from the monitored network (e.g., anonymized data 336 and/or data 334) and, in turn, assess the data using one or more anomaly detectors 406. At the core of each anomaly detector 406 may be a corresponding anomaly detection model, such as an unsupervised learning-based model.

In various embodiments, anomaly detector(s) 406 and explanation model(s) 408 may be deep neural network (DNNs), or other suitable machine learning-based models, to operate as follows:

Anomaly detector 406 is tasked with the detection of explainable anomalies.

Explanation model 408 is tasked with explaining anomalies produced by anomaly detector 406.

In general, an anomaly detected by anomaly detector 406 may be considered to be explainable, if it can be successfully predicted by explanation model 408. Said differently, analyzer 312 may consider an anomaly detected by anomaly detector 406 to be explainable, if explanation model 408 was also able to correctly predict its detection. One key aspect of the techniques herein is that anomaly detector 406 and explanation model 408 do not share any input features, according to various embodiments. In particular, anomaly detector 406 may take as input contextual features/measurements, whereas explanation model 408 relies on explanatory features/measurements for its inputs.

During execution, training process 410 may train both the models of anomaly detector 406 and explanation model 408 end-to-end with a collaborative loss that may comprise any or all of the following:

A quantile regression loss that represents the ability of anomaly detector 406 to detect rare events (e.g., behavioral anomalies in the monitored network).

A regression loss that represents the ability of explanation model 408 to predict when the actual target value will be beyond the anomaly detection threshold of anomaly detector 406 (e.g., when detector 406 will detect an anomaly).

In various embodiments, training process 410 may use the collaborative loss to back-propagate the errors across the model of anomaly detector 406, which effectively learns how to detect anomalies that are both statistical outliers (e.g., according to the first component of the collaborative loss) and explainable (e.g., according to the second component of the collaborative loss). In further embodiments, training process 410 may train explanation model 408 using only the second component of the collaborative loss.

In the context of training process 410 collaboratively training both anomaly detector 406 and explanation model 408, the information transferred between the two models consist in the unique threshold the two models are estimating, while the supervised task is the percentile regression that the model of anomaly detector is trained to solve. The net result of this collaborative scheme is a system that provides three types of information for every sample fed to machine learning-based analyzer 312:

The prediction of anomaly detector 406 for the anomaly threshold $T_{AD}$

The prediction of explanation model 408 for the anomaly threshold $T_{EXP}$

The importance score for each explanatory feature/measurement used as input to explanation model 408

Using the above, analyzer 312 may determine whether an anomaly has been detected by comparing the target value Y with the thresholds $T_{AD}$ and $T_{EXP}$. Typically, analyzer 312 may only raise a detected anomaly (e.g., via interface 318), if Y is larger than both of these thresholds, in order to minimize the number of false positives and to report anomalies that can be accurately explained in terms of the explanatory features.

In some embodiments, analyzer 312 may employ a feature attribution technique, to determine the underlying features/measurements that allowed explanation model 408 to predict that anomaly detector 406 would detect an anomaly. For example, if $Y>T_{AD}$ and $Y>T_{EXP}$, analyzer 312 may use an integrated gradients or Deep Taylor Decomposition approach, to assign attribution scores to the various input features/measurements to explanation model 408. Note that when $Y>T_{AD}$ and $Y>T_{EXP}$, this means that a real outlier has been found by anomaly detector 406 and contextual data used by explanation model 408 can be used to explain the issue that caused the anomaly, e.g., based on the attribution scores assigned to the various input features to model 408 that may explain the issue.

The techniques herein have been implemented and tested on both artificial and real data. One of the first clear effect of collaborative training settings is the fact that the anomaly detection model will naturally shift its predictions towards the natural rate of outliers, even when initially set up with a relatively large quantile (e.g., 10%, etc.). For instance, on artificial data (e.g., with a ground truth that contains artificially injected anomalies), it was observed than an anomaly detection model producing a baseline anomaly rate of 8%, without collaborative training, will naturally reduce this rate to approximately 3% when trained collaboratively using the techniques herein. This rate corresponds to a precision and recall of 66% and 92%, respectively. However, the corresponding co-trained explanation model was also found to achieve precision and recall of 100% and 93.9%, respectively, using artificial anomalies.

Figure 5:
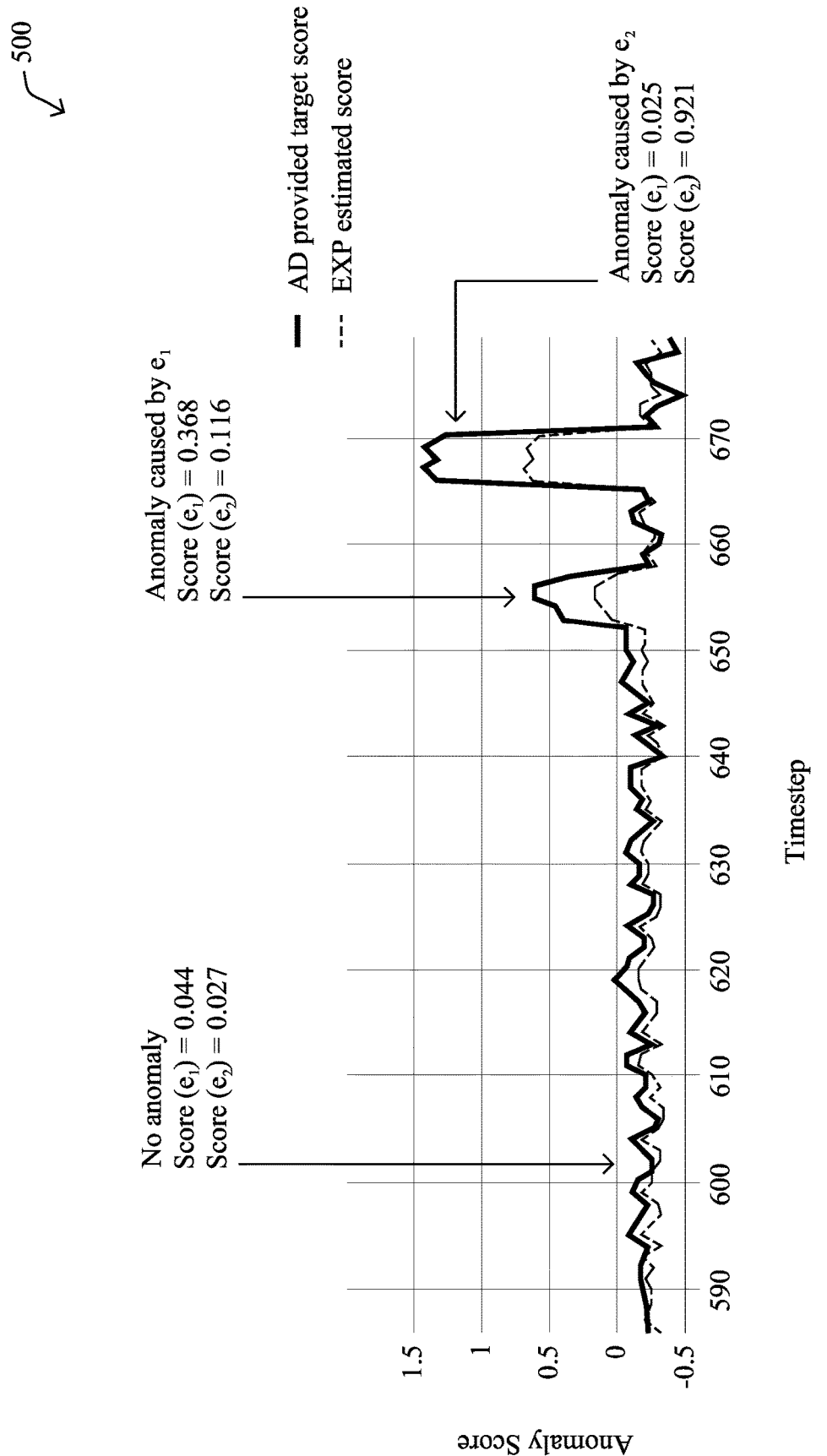
FIG. 5 illustrates an example plot of the detection of network behavioral anomalies.

Thus, if anomaly detection alerts are sent to the user interface only when both $Y>T_{AD}$ and $Y>T_{EXP}$, the resulting system is extremely robust and provides explanatory features essentially "for free," as shown in plot 500 in FIG. 5. Notably, as shown, assume that the anomaly score is defined as $T_{XX}-Y$. That is, the anomaly score is negative for normal samples and positive for anomalous samples. Also show are the attribution scores for two features/measurements, $e_1$ and $e_2$, at different points in time. From plot 500, it can be seen how the corresponding attribution scores increase as the anomaly score of the explanation model goes above zero. In other words, the higher the value of Y, the stricter the system is to select a given anomaly for reporting.

Figure 6:
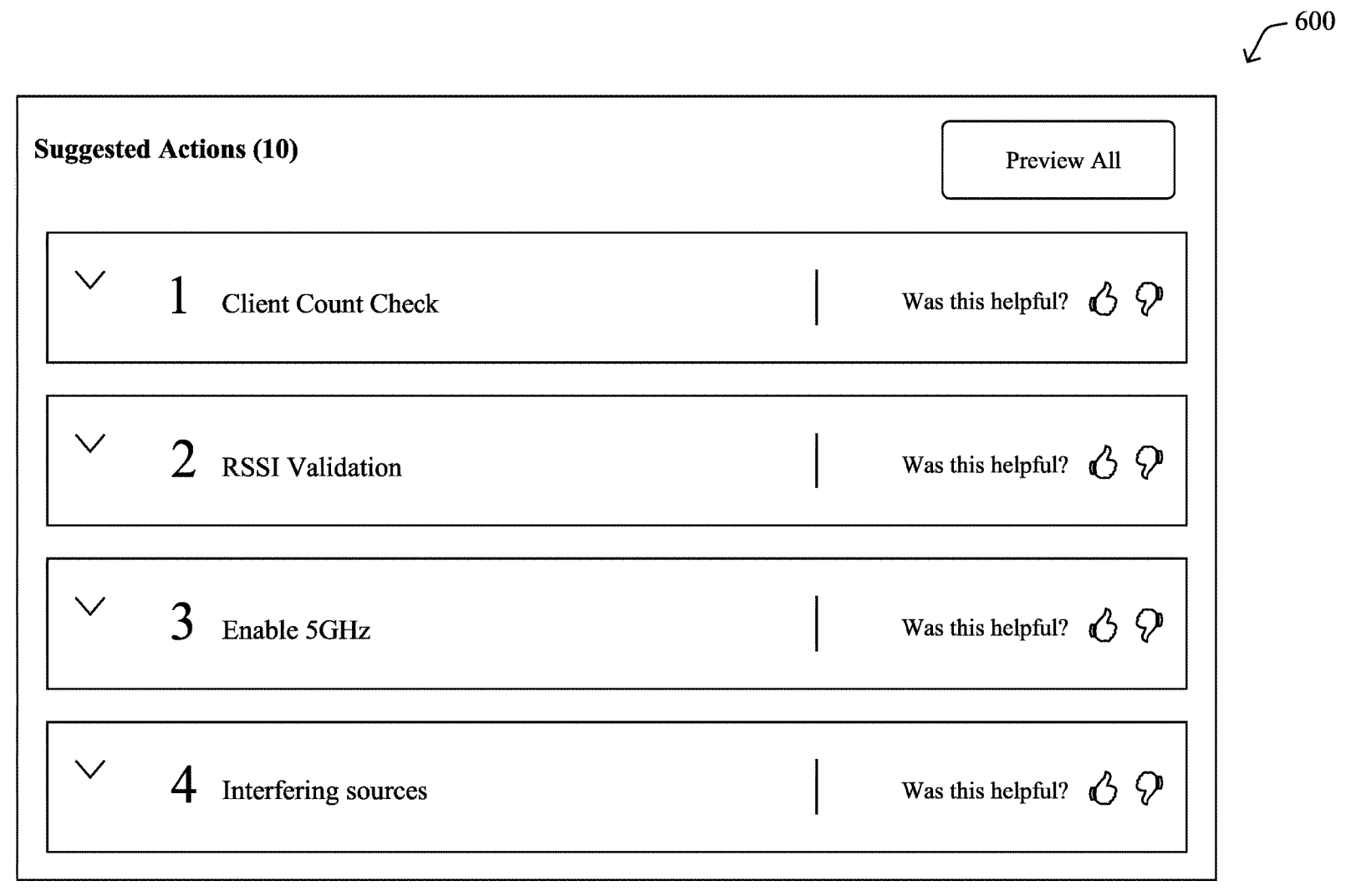

In some embodiments, the network assurance system can use the attribution scores assigned to explanatory features/measurements to automatically select the key performance indicators (KPIs)/measurements for presentation with the anomaly alert as candidate root causes for the alert. Furthermore, these scores can also be used to select and/or order suggested actions, as shown in example display 600 in FIG. 6 of suggested actions for a detected anomaly, which the network assurance service can provide to the user interface. In example display 600, every suggested action can be loosely related to a corresponding KPI, such as client count, RSSI, frequency, interference, etc. As a result, the system may dynamically modify the order or even exclude some of these actions based on the attribution score obtained from the explanation model for the specific anomaly being reported.

To restate, the framework introduced herein allows a network assurance service to raise alerts only for behavioral anomalies in the monitored network that also are explainable in terms of other measurements in the network. However, there may also be the case in which a detected anomaly is not explainable due to the set of measurements/features assessed by the explanation model. In some embodiments, the network assurance service may still present these types of anomalies to the user and collect feedback regarding which other features/measurements may be missing as input to the explanation model. In turn, the training process may use the feedback to modify the explanation model to also use the indicated feature(s)/measurement(s).

By way of a more specific example, the following measurements/features from the network were used as input to a prototype anomaly detector configured to detect onboarding failures (aggregated at the SSID level):

recent-past time series of the fraction of failed onboardings, number of distinct clients, number of radios involved in onboardings, the number of onboarding sequences, some other features about the authorization step in the association sequence.

The input features/measurements for the explanation model were as follows:

count and percentage of errors of kind "Timeout EAP ID", count and percentage of errors of kind "Timeout four-way key", count and percentage of errors of kind "Client Blacklisted", count and percentage of errors of kind "Timeout spam reassoc", count and percentage of errors of kind "Mobile repeated reassocs", count and percentage of errors of kind "Mobile repeated reassocs", count and percentage of errors of kind "AAA authentication fail".

As would be appreciated from the above, the prototype anomaly detector and explanation model use entirely different input datasets.

Figure 7:
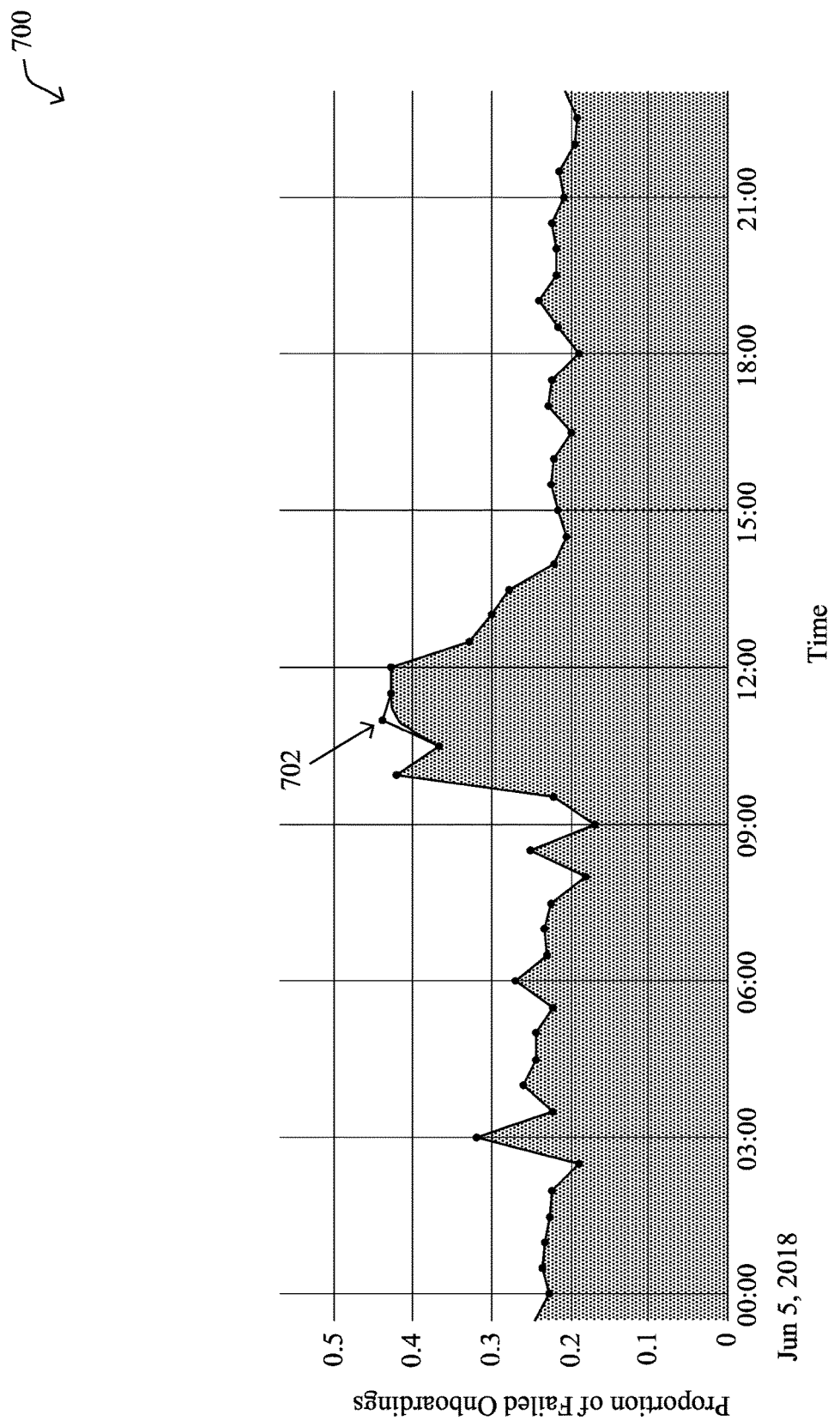
FIG. 7 illustrates an example plot of a detected onboarding anomaly.

FIG. 7 illustrates an example plot 700 of a detected onboarding anomaly, according to various embodiments. As shown, plot 700 plots the proportion of failed onboardings assessed by the prototype system for a given SSID over the span of a day. The area below the plot defines the range of values that are considered to be non-anomalous at any given time. The only point outside of this area, point 702, represents the only onboarding anomaly that occurred on that SSID during the observation window.

Figure 8:
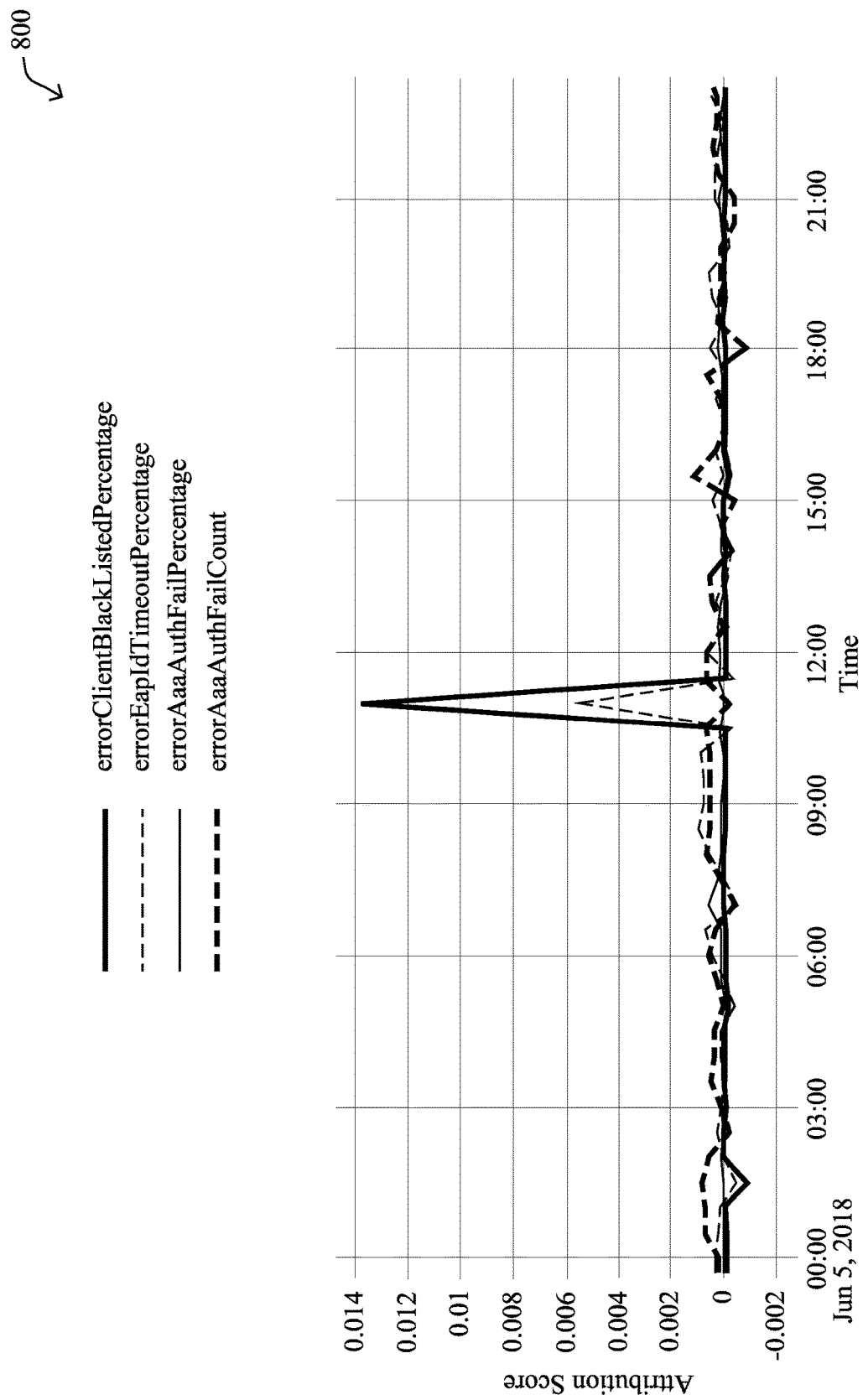
FIG. 8 illustrates an example plot of attribution values for network measurements over time.

FIG. 8 illustrates an example plot 800 of attribution values for network measurements over time, according to various embodiments. As shown, attribution values for a subset of the telemetries/measurements used as input to the explanation model during testing are evolving over time. Notably, the attribution values were observed to suddenly increase for only two of the measurements and only during the time that the time that the anomaly occurred. In this case, these two measurements may be reported as explanations with the anomaly detection alert. Thus, the anomaly detection alert may indicate that an onboarding anomaly was detected that could be explained by the percentage of error of kind "blacklisted clients" and/or the percentage of errors of the kind "EAP ID timeout."

Figure 9:
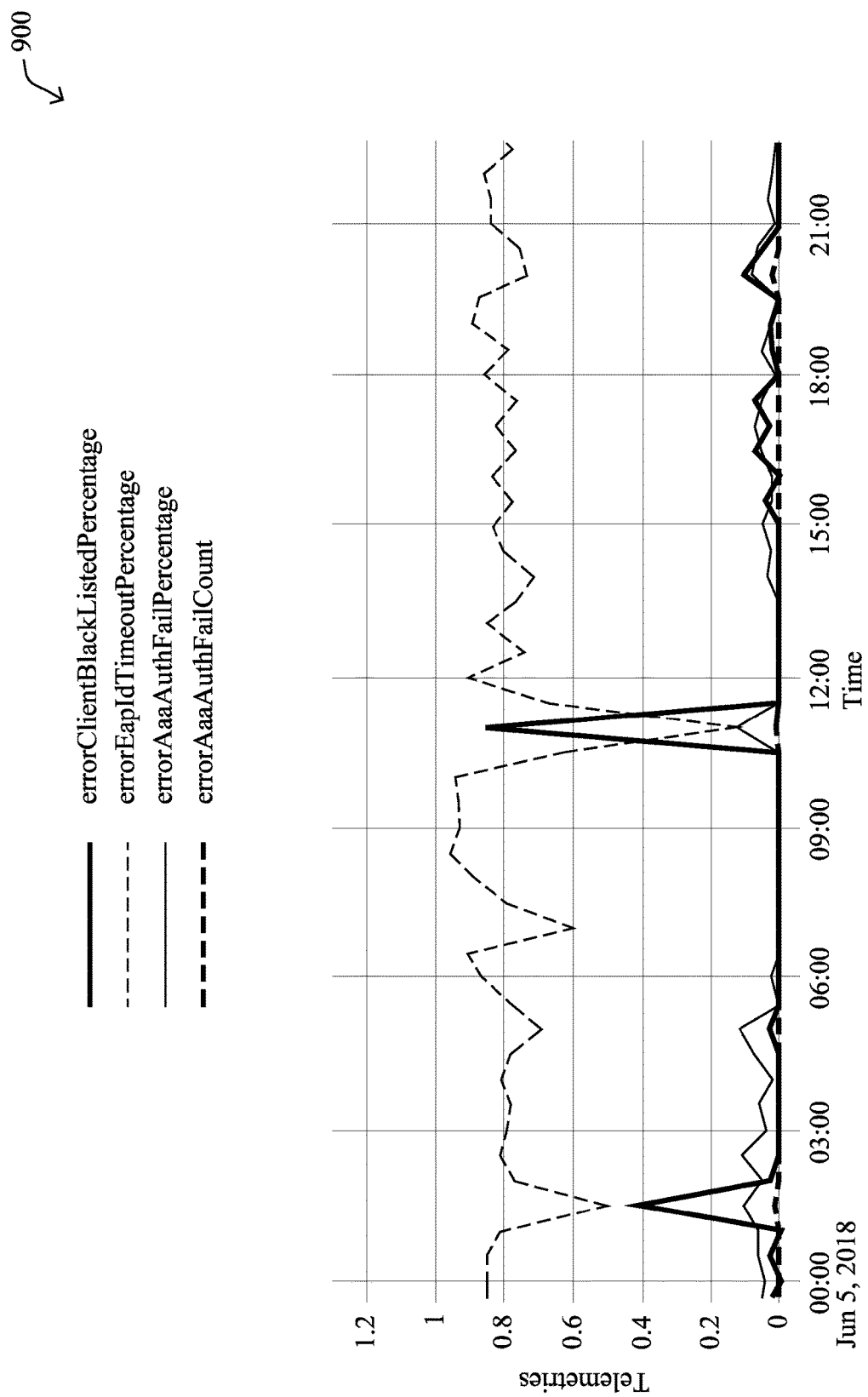
FIG. 9 illustrates another example plot of network metrics over time.

FIG. 9 illustrates another example plot 900 of network metrics over time, according to various embodiments. Continuing the assessment of the prototype, plot 900 illustrates the evolution of the actual telemetries/metrics taken into account above. From plot 900, it can be seen that the two selected telemetries, the percentage of error of kind "blacklisted clients" and the percentage of errors of kind "EAP ID timeout" present anomalous behaviors at the moment in which the anomaly is happening. In this example, it can be seen how the system effectively detects actual anomalous dynamics in the network across different telemetries and automatically correlates them so to help to find the explanation to the triggered anomaly.

Figure 10:
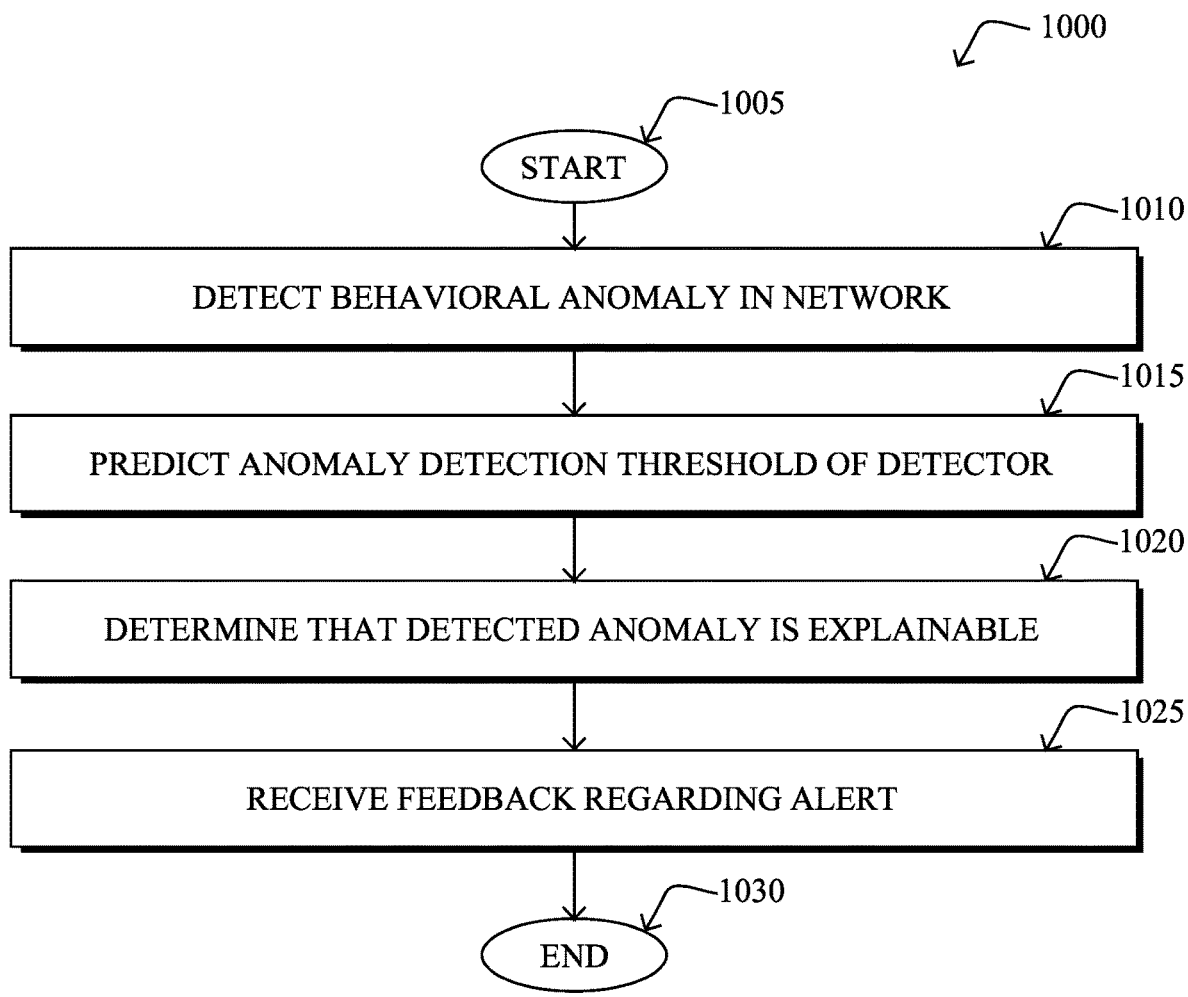
FIG. 10 illustrates an example simplified procedure for collaborative anomaly detection and explanation.

FIG. 10 illustrates an example simplified procedure for collaborative anomaly detection and explanation, in accordance with one or more embodiments described herein. For example, a non-generic, specifically configured device (e.g., device 200) may perform procedure 1000 by executing stored instructions (e.g., process 248), to provide a network assurance service. The procedure 1000 may start at step 1005, and continues to step 410, where, as described in greater detail above, the service may detect a behavioral anomaly in the monitored network using a machine learning-based anomaly detector. Notably, the anomaly detector may detect the anomaly by comparing an anomaly detection threshold to a target value calculated based on a first set of one or more measurements from the network. For example, the first set of one or more measurements is indicative of at least one of: failed wireless onboardings in the network, number of clients in the network, number of radios in the network used for wireless onboarding, and/or association information.

At step 1015, as detailed above, the service may use a machine learning-based explanation model to predict when the anomaly detector will detect anomalies. During operation, explanation model may take as input a second set of one or more measurements from the network that differ from the first set of one or more measurements. For example, if the first set of one or more measurements is indicative of at least one of: failed wireless onboardings in the network, number of clients in the network, number of radios in the network used for wireless onboarding, or association information, the second set of one or more measurements may be indicative of at least one of: authentication failures, client blacklistings, wireless reassociation timeouts, repeated associations, or extensible authentication protocol (EAP) identifiers.

At step 1020, the service may determine that the behavioral anomaly detected by the anomaly detector is explainable, based on the explanation model correctly predicting the detection of the anomaly by the anomaly detector, as described in greater detail above. For example, if the explanation model predicted that the anomaly detector would detect an anomaly, and the anomaly detector did so, the service may determine that the detected anomaly is explainable. In other words, if the target value $Y>T_{AD}$, the threshold for the anomaly detector and $Y>T_{EXP}$, the threshold for the explanation model, the service may conclude that the detected anomaly is explainable.

At step 1025, as detailed above, the service may provide an anomaly detection alert for the detected anomaly to a user interface, based on the detected anomaly being explainable. In general, the anomaly detection alert indicates at least one measurement from the second set as an explanation for the detected anomaly. For example, in some embodiments, the service may calculate attribution scores for the one or more measurements in the second set using integrated gradients or Deep Taylor Decomposition, each attribution score representing how influential that measurement was on the prediction by the explanation model. In turn, the service may identify one or more of the measurements with the highest attribution scores as the explanations for the anomaly to be provided with the anomaly detection alert. Procedure 1000 then ends at step 1030.

It should be noted that while certain steps within procedure 1000 may be optional as described above, the steps shown in FIG. 10 are merely examples for illustration, and certain other steps may be included or excluded as desired. Further, while a particular order of the steps is shown, this ordering is merely illustrative, and any suitable arrangement of the steps may be utilized without departing from the scope of the embodiments herein.

The techniques described herein, therefore, allow for both anomaly detection and explanation within a network assurance service. In some aspects, both the anomaly detection model and the explanation model may be trained in a collaborative manner and may use different measurements from the monitored network as inputs. Consequently, the network assurance service can not only detect anomalous behaviors in the network, but also use the explanations for the anomalies to inform the network administrator of the cause(s) and potentially suggest corrective measures.

While there have been shown and described illustrative embodiments that provide for a deep learning architecture for collaborative anomaly detection and explanation, it is to be understood that various other adaptations and modifications may be made within the spirit and scope of the embodiments herein. For example, while certain embodiments are described herein with respect to using certain models for purposes of anomaly detection, the models are not limited as such and may be used for other functions, in other embodiments. In addition, while certain protocols are shown, other suitable protocols may be used, accordingly.

The foregoing description has been directed to specific embodiments. It will be apparent, however, that other variations and modifications may be made to the described embodiments, with the attainment of some or all of their advantages. For instance, it is expressly contemplated that the components and/or elements described herein can be implemented as software being stored on a tangible (non-transitory) computer-readable medium (e.g., disks/CDs/RAM/EEPROM/etc.) having program instructions executing on a computer, hardware, firmware, or a combination thereof. Accordingly this description is to be taken only by way of example and not to otherwise limit the scope of the embodiments herein. Therefore, it is the object of the appended claims to cover all such variations and modifications as come within the true spirit and scope of the embodiments herein.

What is claimed is:

1. A method comprising:
    detecting, by a network assurance service that monitors a network, a behavioral anomaly in the monitored network using a machine learning-based anomaly detector, wherein the anomaly detector detects the anomaly by comparing an anomaly detection threshold to a target value calculated based on a first set of one or more measurements from the network;
    using, by the network assurance service, a machine learning-based explanation model to predict when the anomaly detector will detect anomalies, wherein the explanation model takes as input a second set of one or more measurements from the network that differ from the first set of one or more measurements;
    determining, by the network assurance service, that the behavioral anomaly detected by the anomaly detector is explainable, based on the explanation model correctly predicting the detection of the anomaly by the anomaly detector; and
    providing, by the network assurance service, an anomaly detection alert for the detected anomaly to a user interface, based on the detected anomaly being explainable, wherein the anomaly detection alert indicates at least one measurement from the second set as an explanation for the detected anomaly.

2. The method as in claim 1, wherein the first set of one or more measurements is indicative of at least one of: failed wireless onboardings in the network, number of clients in the network, number of radios in the network used for wireless onboarding, or association information.

3. The method as in claim 1, wherein the second set of one or more measurements is indicative of at least one of: authentication failures, client blacklistings, wireless reassociation timeouts, repeated associations, or extensible authentication protocol (EAP) identifiers.

4. The method as in claim 1, further comprising:
    calculating attribution scores for the one or more measurements in the second set using integrated gradients or Deep Taylor Decomposition, wherein a particular attribution score for a particular measurement represents how influential that measurement was on the prediction by the explanation model; and
    identifying the measurement with the highest attribution score as the explanation for the detected anomaly.

5. The method as in claim 1, further comprising:
    training the anomaly detector using a collaborative loss that comprises a quantile regression loss that represents an ability of the anomaly detector to detect anomalies and a regression loss that represents an ability of the explanation model to predict when the anomaly detector will detect anomalies.

6. The method as in claim 5, wherein training the anomaly detector comprises:
    training the explanation model using the regression loss.

7. The method as in claim 1, wherein the anomaly detector and explanation model comprise deep neural networks (DNNs).

8. The method as in claim 1, further comprising:
    using the explanation model to determine that a second behavioral anomaly detected by the anomaly detector in the monitored network is not explainable;
    obtaining feedback from the user interface regarding the second anomaly; and
    using the feedback from the user interface to adjust the explanation model.

9. The method as in claim 1, wherein determining that the behavioral anomaly detected by the anomaly detector is explainable, based on the explanation model correctly predicting the detection of the anomaly by the anomaly detector, comprises:
    comparing the target value to a detection threshold of the explanation model.

10. An apparatus, comprising:
    one or more network interfaces to communicate with a network;
    a processor coupled to the network interfaces and configured to execute one or more processes; and
    a memory configured to store a process executable by the processor, the process when executed configured to:
    detect a behavioral anomaly in a monitored network using a machine learning-based anomaly detector, wherein the anomaly detector detects the anomaly by comparing an anomaly detection threshold to a target value calculated based on a first set of one or more measurements from the network;
    use a machine learning-based explanation model to predict when the anomaly detector will detect anomalies, wherein the explanation model takes as input a second set of one or more measurements from the network that differ from the first set of one or more measurements;
    determine that the behavioral anomaly detected by the anomaly detector is explainable, based on the explanation model correctly predicting the detection of the anomaly by the anomaly detector; and
    provide an anomaly detection alert for the detected anomaly to a user interface, based on the detected anomaly being explainable, wherein the anomaly detection alert indicates at least one measurement from the second set as an explanation for the detected anomaly.

11. The apparatus as in claim 10, wherein the first set of one or more measurements is indicative of at least one of: failed wireless onboardings in the network, number of clients in the network, number of radios in the network used for wireless onboarding, or association information.

12. The apparatus as in claim 10, wherein the second set of one or more measurements is indicative of at least one of: authentication failures, client blacklistings, wireless reassociation timeouts, repeated associations, or extensible authentication protocol (EAP) identifiers.

13. The apparatus as in claim 10, wherein the process when executed is further configured to:
    calculate attribution scores for the one or more measurements in the second set using integrated gradients or Deep Taylor Decomposition, wherein a particular attribution score for a particular measurement represents how influential that measurement was on the prediction by the explanation model; and identify the measurement with the highest attribution score as the explanation for the detected anomaly.

14. The apparatus as in claim 10, wherein the process when executed is further configured to:

train the anomaly detector using a collaborative loss that comprises a quantile regression loss that represents an ability of the anomaly detector to detect anomalies and a regression loss that represents an ability of the explanation model to predict when the anomaly detector will detect anomalies.

15. The apparatus as in claim 14, wherein the apparatus trains the anomaly detector by:

training the explanation model using the regression loss.

16. The apparatus as in claim 10, wherein the anomaly detector and explanation model comprise deep neural networks (DNNs).

17. The apparatus as in claim 10, wherein the process when executed is further configured to:

use the explanation model to determine that a second behavioral anomaly detected by the anomaly detector in the monitored network is not explainable;

obtain feedback from the user interface regarding the second anomaly; and use the feedback from the user interface to adjust the explanation model.

18. The apparatus as in claim 10, wherein the apparatus determines that the behavioral anomaly detected by the anomaly detector is explainable, based on the explanation model correctly predicting the detection of the anomaly by the anomaly detector, by:

comparing the target value to a detection threshold of the explanation model.

19. A tangible, non-transitory, computer-readable medium storing program instructions that cause a network assurance service that monitors a network to execute a process comprising:

detecting, by the network assurance service, a behavioral anomaly in the monitored network using a machine learning-based anomaly detector, wherein the anomaly detector detects the anomaly by comparing an anomaly detection threshold to a target value calculated based on a first set of one or more measurements from the network;

using, by the network assurance service, a machine learning-based explanation model to predict when the anomaly detector will detect anomalies, wherein the explanation model takes as input a second set of one or more measurements from the network that differ from the first set of one or more measurements;

determining, by the network assurance service, that the behavioral anomaly detected by the anomaly detector is explainable, based on the explanation model correctly predicting the detection of the anomaly by the anomaly detector; and providing, by the network assurance service, an anomaly detection alert for the detected anomaly to a user interface, based on the detected anomaly being explainable, wherein the anomaly detection alert indicates at least one measurement from the second set as an explanation for the detected anomaly.

20. The computer-readable medium as in claim 19, wherein the process further comprises:

training the anomaly detector using a collaborative loss that comprises a quantile regression loss that represents an ability of the anomaly detector to detect anomalies and a regression loss that represents an ability of the explanation model to predict when the anomaly detector will detect anomalies.

* * * * *